United States Patent [19]

Bernier et al.

[11] Patent Number: 5,191,062

[45] Date of Patent: Mar. 2, 1993

[54] STEAM PURGING OF GRANULAR EPDM RESINS

[75] Inventors: Robert J. Bernier, Flemington; Duan-Fan Wang, Somerville, both of N.J.

[73] Assignee: Union Carbide Chemicals & Plastics Technology Corporation, Danbury, Conn.

[21] Appl. No.: 766,405

[22] Filed: Sep. 27, 1991

[51] Int. Cl.$^5$ ............................ C08F 6/28; C08F 6/26
[52] U.S. Cl. ................................... 528/483; 528/500; 585/803; 585/810; 203/14
[58] Field of Search ............... 528/483, 500; 526/282; 203/14; 585/803, 810

[56] References Cited

U.S. PATENT DOCUMENTS 4,332,933 6/1982 Di Drusco et al. ................. 528/500
4,758,654 7/1988 Brod et al. ........................... 528/483
5,051,456 9/1991 Bernier et al. ................... 528/483 X
5,071,950 12/1991 Borho et al. ........................ 528/483

Primary Examiner—Fred Teskin
Attorney, Agent, or Firm—C. J. Vicari

[57] ABSTRACT

A process for substantially removing and recovering unreacted diene monomer from ethylene propylene diene monomer resin produced in a fluidized bed reactor by purging the resin with steam in a purging zone, the resin being introduced in the purging zone at a temperature above the temperature of the steam in the purging zone.

18 Claims, 1 Drawing Sheet

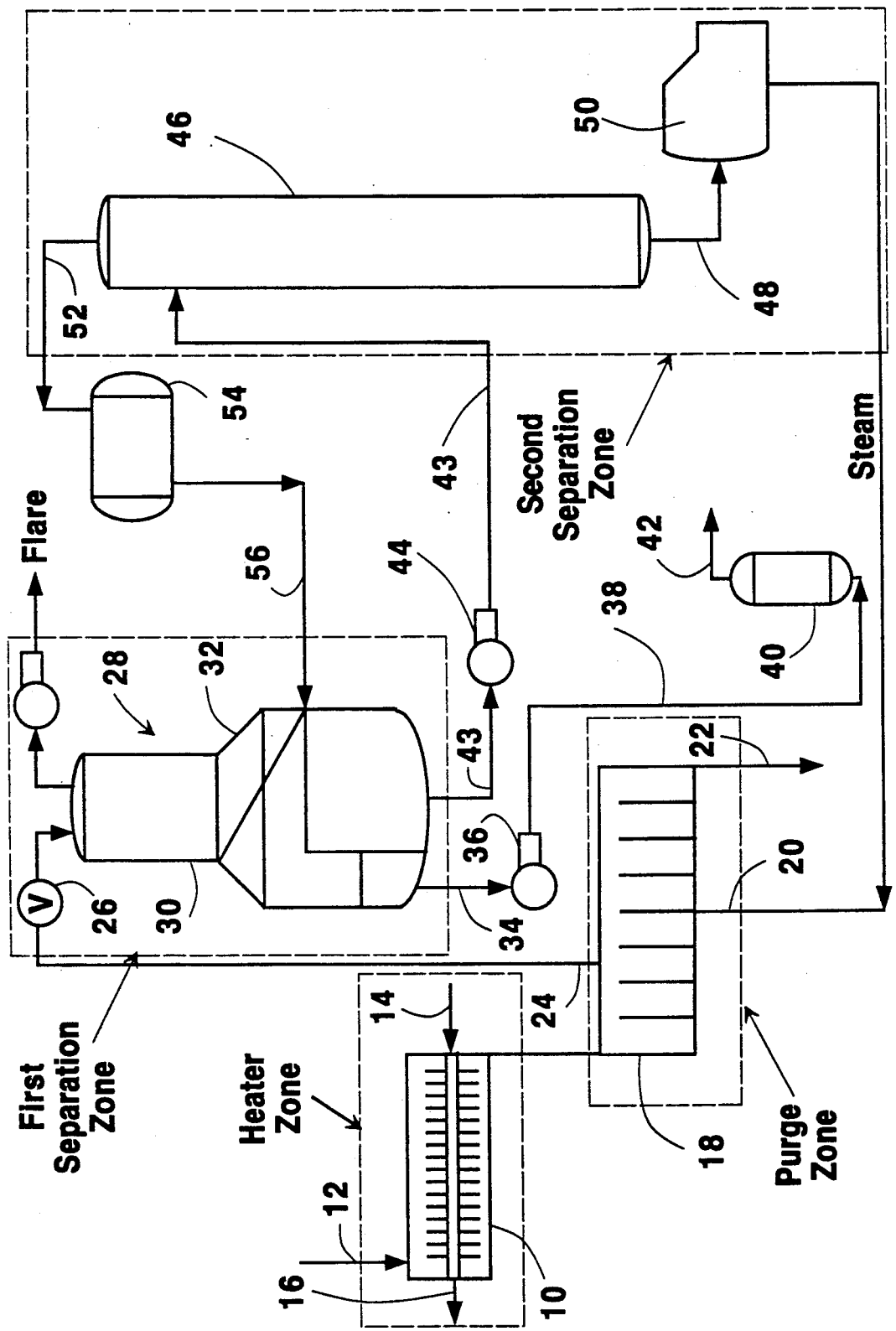

STEAM PURGING OF GRANULAR EPDM RESINS

The present invention relates to a process for purging ethylene propylene diene monomer (EPDM) resins and more particularly to a process for steam purging EPDM resins to remove diene monomer particularly ethylidene norbornene from the EPDM resin.

BACKGROUND OF THE INVENTION

The economics of EPDM resin processes depend greatly on the effectiveness of the diene monomer recovery system. The diene monomer constitutes a small part of the polymer composition, typically about 2% to 8%. However, the polymer concentration of unreacted diene is substantial. At approximately five times the cost of the propylene monomer, a few percent of unrecovered diene monomer can have a devastating effect on the economic viability of the process. Conversely, the high value of the diene monomer justifies the investment and operating costs of equipment dedicated to its recovery and reuse in the reactor.

In general, current production facilities for producing EPDM resin are based on slurry or solution processes. In these processes, the polymer accounts for only a small fraction of the total weight of the reactor effluent. For example, in the solution process, the polymer fraction is typically less than 10% while the composition of the remaining 90% is a mixture of solvent and liquid monomers.

Typically, in a solution process, unreacted monomers and solvent are removed in three steps. In the first step, the solution is pumped and flashed into a vessel where the lighter hydrocarbons are vaporized. A substantial amount of unreacted diene monomer still remains in the polymer because of its higher molecular weight and its greater affinity to the polymer. Ethylene and most of the propylene are extracted during this first pass.

In a second step, a pump pressurizes the polymer enriched solution through an atomizer to create fine droplets. The atomization produces two major benefits. First, it promotes faster evaporation rates of the diluent by creating larger surfaces for mass transfer with the breakup of the fluid in small droplets. Second, as the evaporation proceeds, the solid fraction in the droplets increases, yielding ultimately fine particles of highly concentrated polymer. The creation of these fine particles is critical for the last treatment step which consists of collecting these particles in a water bath maintained at high temperature by bubbling steam through the water. The purpose of the water is to increase the temperature of the particles to accelerate the desorption rate of the diene monomer residues. This is necessary because dienes used in the fabrication of EPDM resins have typically high boiling points and have a much lower mobility than the other components in the polymer matrix. In the literature, the process just described is commonly referred to as steam stripping. An example of this process is disclosed in British patent 1,104,740. Other examples abound in relation to the process of steam stripping vinyl (VC) from polyvinyl chloride (PVC) such as disclosed in British patent 1,577,381.

Once in the water bath, the fine particles agglomerate into larger ones of irregular shape due to the stickiness of the product at this temperature. The agglomerates or crumbs collect at the bottom of the vessel under the effect of gravity. They are subsequently retrieved, screened and pressed to remove the excess water. The product is then baled and packaged.

The recovery of the solvent, monomers and dienes is made by multiple separation columns which are simple in concept but substantial in size due to the sheer volume of liquids and gas to be treated.

More recently, EPDM resins are also being produced by a gas phase process such as disclosed in U.S. Pat. No. 4,994,534. The gas phase production of EPDM resins results in a product morphology similar to other alpha-olefins produced in gas phase reaction. The polymer is obtained in particle form with an average particle size ranging from about 0.015 to 0.04 inch and a particle size distribution typical for this process. The comparatively larger size of the particles renders inefficient the steam stripping process described earlier.

Gas phase reactor products are polymerized with high activity catalysts. The low catalyst residues remaining do not warrant an extraction step and are readily deactivated by means of additives. They also require only a mild treatment to remove unreacted monomers and other inert hydrocarbons dissolved in the polymer.

Thus in the gas phase process, the removal of the unreacted monomers and solvent dissolved in the polymer is based on contacting the polymer with an inert gas such as nitrogen for a period of time. Descriptions of these processes abound in the literature.

The problem becomes even more significant when ethylidene norbornene (ENB) is used as a monomer. ENB is intentionally added to the reaction system to produce terpolymers of ethylene and propylene. Once incorporated on the polymer chain backbone, ENB supplies a pendant double bond available for cross-linking the network of polymer chains under sulfur cure conditions.

The necessity of removing ENB is many fold. ENB is a flammable hydrocarbon which should be removed from the product for safety reasons. In addition, ENB has a very distinctive and unpleasant odor with a very low human detection threshold. Finally, the removal of ENB and its reuse in the reactor is critical to the economics of the manufacturing process of EPDM resins.

ENB has a molecular weight of 120 and a normal boiling point of 148° C. Compared to a lighter hydrocarbon often encountered in the production of alpha olefin polymers such as 1-hexene, ENB requires 6 to 10 times longer to desorb from an EPDM resin under equivalent processing conditions.

In addition to having slower desorption rates than the usual olefins and solvent encountered in gas phase operation, the driving force to initiate desorption is comparatively very weak as indicated by the high solubility of ENB vapors in contact with an EPDM polymer.

The significance of the intrinsic diffusivity and solubility properties of the ENB and polymer system has major implications on the design of processes aimed at removing ENB residues from the polymer particles. Under the best of circumstances, the purging facilities will be large compared to other processes designed to remove lower boiling point monomers resulting in a substantial increase in investment costs.

The high solubility of ENB has an even larger impact. To desorb, the partial pressure of ENB in the gas phase must be substantially lower than its equilibrium pressure. The equilibrium pressure in the context of desorption is defined as the pressure needed to maintain a given dissolved concentration of ENB in the polymer.

For this reason, a large flow of purge gas is needed to effect the desorption of ENB. The gas exits the purger with a very low concentration of ENB in the gas phase. ENB high dilution and the large amount of purge gas utilized per pound of processed ENB has necessitated a separation system that translates in a costly investment and a high operation cost.

It is therefore an object of the present invention to provide a process designed to remove diene monomers, particularly ENB, from EPDM resins in an economical manner. Other objects and advantages of the present invention will become apparent as the invention and the problem that it addresses are described in more detail.

SUMMARY OF THE INVENTION

Broadly contemplated the present invention provides a process for substantially removing and recovering unreacted diene monomer from ethylene propylene diene monomer resin produced in a fluidized bed reactor which comprises:

(a) directing said resin into a purging zone in contacting relationship with steam in an amount and at a velocity sufficient to remove substantially all unreacted diene monomer from said EPDM resin said resin being introduced at a temperature above the temperature of the steam in said purging zone;

(b) discharging said EPDM resin containing removed diene monomer from said purging zone;

(c) discharging a stream including steam and diene monomer from said purging zone and thereafter introducing said stream into a steam and diene monomer separation zone to condense said steam into water and to separate diene monomer from said water leaving trace amounts of diene monomer in said water;

(d) discharging and recovering said diene monomer removed from said water from said separation zone; and (e) discharging said water containing trace amounts of diene monomer from said separation zone.

Desirably, the water containing trace amounts of diene monomer from step (e) can be heated to form steam which is recycled back to the purging zone.

For optimum results according to the invention, the water and trace amounts of ENB discharged in step (e) can be removed from the water by introducing the water and trace amounts of ENB into a second separator zone containing a distillation column which removes substantially all the water which is then vaporized and directed back to the purging zone as a source of steam. The effluent which is a vaporized concentrated mixture of ENB monomer and water can thereafter be liquified and the liquified water/ENB mixture can thereafter be directed back into the first separation zone.

A significant advantage of the present invention is that the resin is purged in a dry environment i.e., there is no liquid phase present in the process which greatly simplifies separation processes to recover monomers. More significantly the present invention is particularly amenable to purging EPDM polymer particles which are produced in a gas phase process in which a fluidization aid is utilized (such as disclosed in U.S. Pat. No. 4,994,534) to operate in excess of the softening temperature of the polymers.

The diene monomer which is removed is preferably ethylidene norbornene (ENB) and although the following discussion is with reference to removal of ENB monomer, it is to be understood that the removal of other dienes are also contemplated.

BRIEF DESCRIPTION OF THE DRAWING

The sole figure is a schematic representation of the system for substantially removing and recovering unreacted diene monomer e.g., ENB from EPDM resin produced in a fluidized bed reactor.

DESCRIPTION OF THE PREFERRED EMBODIMENTS

The EPDM resins treated according to the present invention are granular resins produced in a fluidized bed reactor. The fluidized bed reactor can be the one described in U.S. Pat. No. 4,482,687 or any other conventional reactor for the gas phase production of, for example, polyethylene, or ethylene copolymers and terpolymers.

Referring to the sole figure, the process is generally conducted in four zones i.e., a resin heater zone, a purging zone, a first separation zone, and a second separation zone.

Situated within the heater zone is a resin heater identified by reference numeral 10. Resin heater 10 can be of any conventional type normally used for heating resins. Fluid bed type heaters are preferred and commonly used for this type of operation. EPDM resin from the reactor containing unreacted ENB monomer is introduced into heater 10 through line 12 and is indirectly heated by a fluid such as steam which is introduced into heater 10 through line 14. Condensate is discharged from heater 10 through line 16.

The heating step is an optional procedure and depends on the temperature of the resin which is kept slightly above that of the temperature of the steam used for purging in the purging zone. It is well known that the temperature of the steam can vary and be influenced by vacuum systems associated with the purger or purge vessel. Thus, if the temperature of the EPDM resin is below the steam temperature in the purger, it can be increased to requirements by passing the resin through heater 10.

From the heating zone, the heated resin is passed through a rotary feeder (not shown) and introduced into the purging zone which contains purge vessel 18 wherein steam is used as a purging gas. Purge vessel 18 can be of the type employing counter-current mass flow wherein the EPDM resin bed moves downward in a plug flow manner while continuously being swept by the steam purging gas. Another type which can be employed is a fluid bed purger operated either in a continuous mode or as a batch mode. However, batch operation requires a battery of purging devices to make the continuity of the upstream process flow. A particularly suitable purge vessel and process is disclosed in copending application Ser. No. 07/701,999 filed May 17, 1991 and assigned to a common assignee.

The steam enters purge vessel 18 through line 20 in an amount sufficient to remove substantially all unreacted ENB monomer from the EPDM resins while providing sufficient velocity to entrain the desorbed monomer and fluidize the resin bed when the purge vessel is of the fluidized bed type. In general for resins with a particle size range of about 0.015" to about 0.05" steam velocities in the range of about 0.05 ft/sec. to about 5 ft/sec. preferably from about 0.2 ft/sec. to about 2.0 ft/sec. are operable. Flow rates of about 0.001 pound of steam under vacuum conditions to 10 pounds of steam at above atmospheric conditions for each pound of EPDM resin preferably about 0.1 to 4 pounds of steam per pound of resin are also operable. Normally the process temperature for purging is kept below the resin sticking temperature defined as the temperature at which the resin starts to agglomerate under similar handling conditions. As is known, the sticking temperature varies largely with the molecular weight and molecular weight distribution of the resin. High Mooney viscosity resins are noticeably less sticky than their lower viscosity counterparts. However if the polymer particle is coated with an inert particulate material such as disclosed in U.S. Pat. No. 4,994,534, the temperature for purging can be above the sticking temperature of the polymer particle. In general temperatures in purge vessel 18 can range from about 40° C. to about 150° C. preferably about 90° C. to about 100° C. Pressures in purge vessel 18 can range from about 1 lbs/in$^2$ to about 65 lbs/in$^2$.

EPDM resin having substantially all the ENB removed is discharged from purge vessel 18 through line 22 and recovered.

The purger gas effluent, composed mainly of steam, a small fraction of ENB and traces of ethylene and propylene is discharged from purge vessel 18 through line 24, passes through butterfly valve 26 in a first separation zone.

In the first separation zone, steam and ENB monomer are condensed and ENB monomer is removed from the water leaving traceable amounts of ENB monomer in the water. For this purpose the first separation zone includes a separator 28. The components of separator 28 include a condenser 30 in communication with an accumulator/decanter 32. Condenser 30 is conventional in the art and serves to condense the steam into water to liquify ENB in condenser 30. Normally for this purpose temperatures in the range of about 0° C. up to about 60° C. or higher can be utilized depending on the pressures utilized in the purge vessel. Pressures of about 0.02 lbs/in$^2$ to 3.6 lbs/in$^2$ can also be utilized. The pressure gradient necessary to move the mass of gas to the resin bed is accomplished by the reduction of the gaseous mass through condensation. Pressure level control is accomplished by butterfly valve 26 by regulating the pressure drop in the incoming purge gas effluent line 24.

Accumulator/decanter 32 is positioned below condenser 30 and serves to separate ENB from water. Since the condensate from condenser 30 is a mixture of water and ENB, separation can be easily accomplished because ENB has a very low solubility in water and separates readily, floating on top of the liquid pool. ENB and water are separated by overflow of ENB, and water containing trace amounts of ENB is removed continuously from the bottom of decanter 32 to maintain a constant level. The separated ENB is discharged from accumulator/decanter 32 through line 34 and passes through pump 36 to dryer 40. Pump 36 pumps ENB to dryer 40 through line 38. Dryer 40 which is conventional e.g. molecular sieves, dries the ENB and the ENB leaves dryer 40 through line 42 where it is recovered or directed back to the polymerization reactor.

Although ENB is practically insoluble in water, small amounts of ENB are nevertheless trapped in the water in accumulator/decanter 32. The amount of ENB remaining is sufficient to warrant further purification before the water is revaporized and reused as the purge gas. Accordingly although the present invention provides improvements in the conventional purging, further improvements can be realized by removing these miniscule amounts of ENB remaining in the water collected at the bottom of accumulator/decanter 32. This purification step is conducted in a second separation zone which includes a conventional distillation column. Thus, water and ENB discharged from accumulator/decanter 32 through line 43 is pumped to the top of distillation column 46 by means of pump 44. Temperatures in distillation column 46 are maintained in the range of about 90° C. to about 160° C. which temperatures serve to further separate water from ENB. The separated water is discharged from condenser 46 through line 48 and is vaporized in a vaporizer 50 and can be directed back to purging vessel 18 in the purging zone.

ENB and water vapor is discharged from condenser 46 through line 52, is condensed in recovery column condenser 54 and the liquid water/ENB mixture is thereafter directed back to accumulator/decanter 32 through line 56.

The following examples will further illustrate the present invention.

EXAMPLE 1

An ethylene-propylene-ethlidenenorbornene terpolymer (EPDM) is prepared by the gas phase process disclosed in U.S. Pat. No. 4,994,534 at a rate of 38,000 lb/hr. The average particle size is 0.031" with a standard deviation equal to 1.68. The residue of ethylidenenorbornene (ENB) in the EPDM polymer is 0.5 wt%.

After polymerization, the granular resin is transferred from the reactor to the heater and heated to 110° C. The resin is then discharged into the plug-flow fluidized bed purger, which is operated at atmospheric pressure. The bed level is 8 ft. The operation temperature of the purger is kept constant at 110° C.

With a steam flow rate at 40,765 lb/hr, the steam superficial velocity in the steam purger vessel is 1.0 ft/sec. which can completely fluidize resins with average particle size up to 0.032".

After 1.0 hour of purging, the ENB residue is reduced from 0.5 wt% to 156 parts per million (ppmw). The purge gas-steam and ENB mixture from the purger is condensed at 60° C. and 3.6 psia in the condenser. ENB is condensed and separated from water in an accumulator/decanter which can then be recycled bask to the polymerization reactor.

EXAMPLE 2

An ethylene-propylene-ethlidenenorbornene terpolymer (EPDM) is prepared by the gas phase process disclosed in U.S. Pat. No. 4,994,534 at a rate of 38,000 lb/hr. The average particle size is 0.02" with a standard deviation equal to 1.68. The residue of ethylidenenorbornene (ENB) in the EPDM polymer is 0.5 wt%.

After polymerization, the granular resin is transferred from the reactor to the heater and heated to 110° C. The resin is then discharged into the plug-flow fluidized bed purger, which is operated at atmospheric pressure. The bed level is 8 ft. The operation temperature of the purger is kept constant at 110° C.

With a steam flow rate at 27,306 lb/hr, the steam superficial velocity in the steam purger is 0.67 ft/sec. which can completely fluidize resins with average particle size up to 0.023".

After 1.0 hour of purging, the ENB residue is reduced from 0.5 wt% to 172 (ppmw). The purge gas-steam and ENB mixture from the purger is condensed at 60° C. and 3.6 psia in the condenser. ENB is condensed and separated from water in an accumulator/decanter.

Water from decanter is pumped to a distillation column to further recover dissolved ENB. The temperature in the distillation column is 116° C. at 27 psi. At this temperature a portion of the water from the steam ENB mixture is condensed, vaporized and is directed back to the purger. The effluent mixture containing vaporized water and ENB is liquified and is directed back to the accumulator/decanter.

EXAMPLE 3

An ethylene-propylene-ethlidenenorbornene terpolymer (EPDM) is prepared by the gas phase process disclosed in U.S. Pat. No. 4,994,534 at a rate of 38,000 lb/hr. The average particle size is 0.02" with a standard deviation equal to 1.68. The residue of ethylidenenorbornene (ENB) in the EPDM polymer is 0.5 wt%.

After polymerization, the granular resin is transferred from the reactor to the heater and heated to 90° C. The resin is then discharged into the plug-flow fluidized bed purger. The steam pressure in the fluidized bed is 8 psia with a bed level of 8 ft. The operation temperature of the purger is kept constant at 90° C.

With a steam flow rate at 43,253 lb/hr, the steam superficial velocity in the steam purger is 0.97 ft/sec. which can completely fluidize resins with average particle size up to 0.03".

After 2.0 hour of purging, the ENB residue is reduced from 0.5 wt% to 123 (ppmw). The purge gas-steam and ENB mixture from the purger is condensed at 30° C. and 0.77 psia in the condenser. ENB is condensed and separated from water in an accumulator/decanter. Water from decanter is pumped to a distillation column to further recover dissolved ENB. The temperature in the distillation column is 116° C. at 27 psi, at this temperature a portion of the water from the steam ENB mixture is condensed, vaporized and is directed back to the purger. The effluent mixture containing vaporized water and ENB is liquified and is directed back to the accumulator/decanter.

EXAMPLE 4

An ethylene-propylene-ethlidenenorbornene terpolymer (EPDM) is prepared by the gas phase process disclosed in U.S. Pat. No. 4,994,534 at a rate of 38,000 lb/hr. The average particle size is 0.02" with a standard deviation, based on log-normal distribution equal to 1.68. The residues of ethylidenenorbornene (ENB) in the EPDM polymer is 0.5 wt%.

After polymerization, the granular resin is transferred from the reactor to the heater and heated to 110° C. The resin is then discharged into an expanded bed purger such as disclosed in a co-pending application Ser. No. 07/701,999 filed May, 1991, which is operated with the pressure in the bottom at 19.5 psia. The bed height is 30 ft. The operation temperature of the purger is kept constant at 110° C. The steam flow rate is 36,000 lb/hr.

After 0.35 hour of purging, the ENB residue is reduced from 0.5 wt% to 186 ppmw. The purge gas-steam and ENB mixture from the purger is condensed at 30° C. in the first separation zone at a total pressure of 0.77 psia. in the condenser. ENB is condensed and separated from water in an accumulator/decanter. Water from decanter is pumped to the distillation column to further recover dissolved ENB.

What is claimed is:

1. A process for substantially removing and recovering unreacted diene monomer from ethylene propylene diene monomer (EPDM) resin produced in a fluidized bed reactor which comprises:
   (a) directing said resin into a purging zone in contacting relationship with steam in an amount and at a velocity sufficient to remove substantially all unreacted diene monomer from said EPDM resin, said resin being introduced at a temperature above the temperature of the steam in said purging zone;
   (b) discharging said EPDM resin, having substantially all the diene monomer removed, from said purging zone;
   (c) discharging a stream including steam and diene monomer from said purging zone and thereafter introducing said stream into a first steam and diene monomer separation zone to condense said steam into water and to separate diene monomer from said water leaving trace amounts of diene monomer in said water;
   (d) discharging and recovering said diene monomer removed from said water from said separation zone; and
   (e) discharging said water containing trace amounts of diene monomer from said separation zone.

2. A process according to claim 1 wherein said diene monomer is ethylidene norbornene.

3. A process according to claim 1 wherein said resin is heated in a heating zone prior to introduction in said purging zone when the temperature of said resin is below the temperature of said steam in said purging zone.

4. A process according to claim 1 wherein said water containing trace amounts of diene monomer from step (e) is heated to form steam and thereafter recycling said steam back to said purging zone.

5. A process according to claim 1 wherein said water containing trace amounts of diene monomer from step (e) is directed into a second separation zone containing a distillation column to distill water from said water containing trace amounts of diene monomer, and to produce an effluent mixture containing a vaporized mixture of water and diene monomer, vaporizing said distilled water, and directing said vaporized water back to said purging zone, liquifying said vaporized water diene monomer mixture and thereafter directing said liquified water diene monomer mixture back to said first separation zone.

6. A process according to claim 1 wherein said steam in said purging zone is at a velocity of about 0.05 ft/sec. to about 5 ft/sec.

7. A process according to claim 1 wherein said steam in said purging zone is at a velocity of about 0.2 ft/sec. to about 2.0 ft/sec.

8. A process according to claim 1 wherein said steam in said purging zone is employed at a flow rate of 0.001 pound of steam per pound of resin to 10 pounds of steam per pound of EPDM resin 9. A process according to claim 1 wherein said steam in said purging zone is at a flow rate of 0.1 pound of steam per pound of resin to 4 pounds of steam per pound of resin.

10. A process for substantially removing, and recovering unreacted ethylidene norbornene (ENB) monomer from ethylene propylene ethylidene norbornene monomer resin produced in a fluidized bed reactor which comprises:
   (a) directing said resin into a purging zone in contacting relationship with steam at a flow rate of 0.001 pound of steam to 10 pounds of steam per pound of resin and a velocity of about 0.05 ft/sec. to 5.0 ft/sec. to remove substantially all unreacted ENB monomer from said resin, said resin being introduced at a temperature above the temperature of the steam in said purging zone;

(b) discharging said resin, having substantially all the ENB monomer removed from said purging zone;

(c) discharging a stream including steam and ENB monomer from said purging zone and thereafter introducing said stream into a first steam and ENB monomer separation zone to condense said steam into water and to separate ENB monomer from said water leaving trace amounts of ENB monomer in said water;

(d) discharging and recovering said ENB monomer removed from said water from said separation zone; and (e) discharging said water containing trace amounts of ENB monomer from said separation zone.

11. A process according to claim 10 wherein said resin is heated in a heating zone prior to introduction in said purging zone when the temperature of said resin is below the temperature of said steam in said purging zone.

12. A process according to claim 10 wherein said water containing trace amounts of ENB monomer from step (e) is heated to form steam and thereafter recycling said steam back to said purging zone.

13. A process according to claim 10 wherein said water containing trace amounts of ENB monomer from step (e) is directed into a second separation zone containing a distillation column to distill water from said water containing trace amounts of ENB monomer and to produce an effluent mixture containing a vaporized mixture of water and ENB monomer, vaporizing said distilled water, and directing said vaporized water back to said purging zone, liquifying said vaporized water ENB monomer mixture and thereafter directing said liquified water ENB monomer mixture back to said first separation zone.

14. A process according to claim 10 wherein said steam in said purging zone is at a velocity of about 0.2 ft/sec. to about 2.0 ft/sec.

15. A process according to claim 10 wherein the flow rate of said steam in said purging zone is about 0.1 pound of steam per pound of resin to 4 pounds of steam per pound of resin.

16. A process for substantially removing (ENB) and recovering unreacted ethylidene norbornene monomer from ethylene propylene ethylidene norbornene, monomer resin produced in a fluidized bed reactor which comprises:

(a) directing said resin into a purging zone in contacting relationship with steam at a velocity of about 0.5 ft/sec. to about 2.0 ft/sec. and a flow rate of about 0.1 pound of steam per pound of resin to 4 pounds of steam per pound of resin to remove substantially all unreacted ENB monomer from said resin, said resin being introduced at a temperature above the temperature of the steam in said purging zone, said resin being heated in a heating zone prior to introduction to said purging zone when the temperature of said resin is below the temperature of said steam in said purging zone;

(b) discharging said resin, having substantially all the ENB monomer removed, from said purging zone;

(c) discharging a stream including steam and ENB monomer from said purging zone and thereafter introducing said stream into a first steam and ENB monomer separation zone to condense said steam into water and to separate ENB monomer from said water leaving trace amounts of ENB monomer in said water;

(d) discharging and recovering said ENB monomer removed from said water from said separation zone; and (e) discharging said water containing trace amounts of ENB monomer from said separation zone.

17. A process according to claim 16 wherein said water containing trace amounts of ENB monomer from step (e) is heated to form steam and thereafter recycling said steam back to said purging zone.

18. A process according to claim 16 wherein said water containing trace amounts of ENB monomer from step (e) is directed into a second separation zone containing a distillation column to distill water from said water containing trace amounts of ENB monomer and to produce an effluent mixture containing a vaporized mixture of water and ENB monomer, vaporizing said distilled water, and directing said vaporized water back to said purging zone, liquifying said vaporized water ENB monomer mixture and thereafter directing said liquified water ENB monomer mixture back to said first separation zone.

* * * * *